July 19, 1966  J. L. BROSCHARD ETAL  3,261,234
TRANSMISSION BEARING
Filed Nov. 6, 1963  2 Sheets-Sheet 1

INVENTORS:
JOHN L. BROSCHARD
TEDRIC A. HARRIS
BY
Howson & Howson
ATTYS.

July 19, 1966  J. L. BROSCHARD ETAL  3,261,234
TRANSMISSION BEARING

Filed Nov. 6, 1963  2 Sheets-Sheet 2

LIFE VS. CLEARANCE AND OUT OF ROUND

INVENTORS:
JOHN L. BROSCHARD
TEDRIC A. HARRIS
BY Howson & Howson
ATTYS.

United States Patent Office 3,261,234
Patented July 19, 1966

3,261,234
TRANSMISSION BEARING
John L. Broschard and Tedric A. Harris, Warminster, Pa., assignors to SKF Industries, Inc., Philadelphia, Pa., a corporation of Delaware
Filed Nov. 6, 1963, Ser. No. 321,887
11 Claims. (Cl. 74—801)

This invention relates to bearing assemblies and more particularly to a new and improved bearing assembly having novel features of construction and arrangement providing an increased resistance to fatigue over a comparatively long period of use.

The term "fatigue life" as used in connection with ball and roller bearing assemblies means that period of service limited by fatigue phenomena. Fatigue of the material from which the bearing is made results from repeated stress under rotation. The effect of fatigue is a spalled area on one or more of the load-carrying surfaces. The term "fatigue life" as used in the specification means, for example, that number of hours under given test conditions which is reached or exceeded by a given percentage of the bearings tested. This "fatigue life" is designated by the letter "L" followed by a number subscript. Thus, $L_{10}$ indicates that only 10% of a given lot of bearings have failed due to fatigue phenomena after a stated number of test hours.

The present invention relates particularly to bearing assemblies used in applications where the assembly is subjected to diametrically opposed load conditions; that is, where the external force components act on the outer ring of the bearing assembly at diametrically opposed points. An example of a bearing assembly subjected to such load conditions is in a planetary reduction gear system, for example, of the type illustrated in the drawings comprising a ring gear, a planet carrier supporting a plurality of planet gears which mesh with the ring gear and a centrally disposed sun gear which meshes with each of the planet gears. Each of the planet gears is supported on a stub shaft carried by the planet carrier by means of a bearing assembly, the inner ring being mounted on the stub shaft and the outer ring being pressed into the planet gear. In this gear system, as the sun gear is rotated, for example, by input means, the planet gears are caused to rotate relative to the ring gear and centrally located sun gear. During rotation of the planet gears, the inner ring of each of the bearing assemblies supporting the planet gears remains fixed relative to the diametrically opposed points where the planet gear meshes with the ring gear and sun gear. At the diametrically opposed points of engagement of the planet gear with the ring and sun gear, there are force components such as a gear tooth tangential force, a gear tooth separating force and a gear tooth moment load on the outer ring of each bearing assembly as illustrated schematically in FIG. 5.

It has been found that the fatigue life of bearing assemblies used in applications where the bearing assembly is loaded for example, at diametrically opposed points as in the planet gear system may be increased by making the diametral clearance between the elements of the bearing assembly greatest at the points of load application. In the present instance, optimum conditions for increasing fatigue life are realized by making the raceway of the inner ring out of round, in the present instance, oval shaped or elliptical with the difference between the major and the minor axis of the inner ring being approximately equal to twice the total diametral clearance between the rolling elements and the inner and outer raceways at the major axis of the inner ring and further by disposing the inner ring relative to the points of force application on the outer ring so that the minor axis lies in a plane passing through the points of application of the diametrically opposed force components on the outer ring. By this arrangement, a greater portion of the separating force energy is used to deflect the ring gear and the roller load distribution within the bearing assembly is altered sufficiently to cause an appreciable improvement in fatigue life. This improved fatigue life is also attributable to lower rolling element loads as well as a reduction in the number of rolling elements under load. Further, by this arrangement, the internal radial clearance in the non-load zone of the bearing may be controlled more accurately thereby minimizing the tendency of the rolling elements to skew and skid under zero load conditions.

With the foregoing in mind, an object of the present invention is to provide a rolling bearing assembly exhibiting an increased resistance to fatigue in applications where force components act at diametrically opposed points on the outer ring of the bearing assembly.

Another object of the present invention is to provide a rolling bearing assembly for use in applications where the load on the bearing acts at diametrically opposed points on the outer ring, the bearing assembly characterized by an inner ring having an out-of-round raceway, for example, elliptical where the minor axis is aligned with a plane passing through diametrically opposed points of the force components.

Other objects of the present invention and the various features and details of a bearing assembly constructed in accordance with the present invention are hereinafter more fully set forth with reference to the accompanying drawings, wherein.

Figure 1:
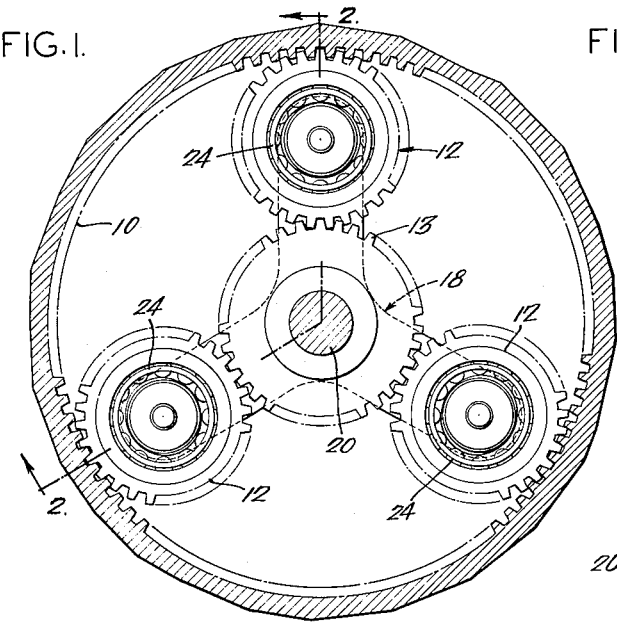
FIG. 1 is a side elevational view partly in section of a planetary gear reduction system incorporating a bearing assembly constructed in accordance with the present invention.
Figure 2:
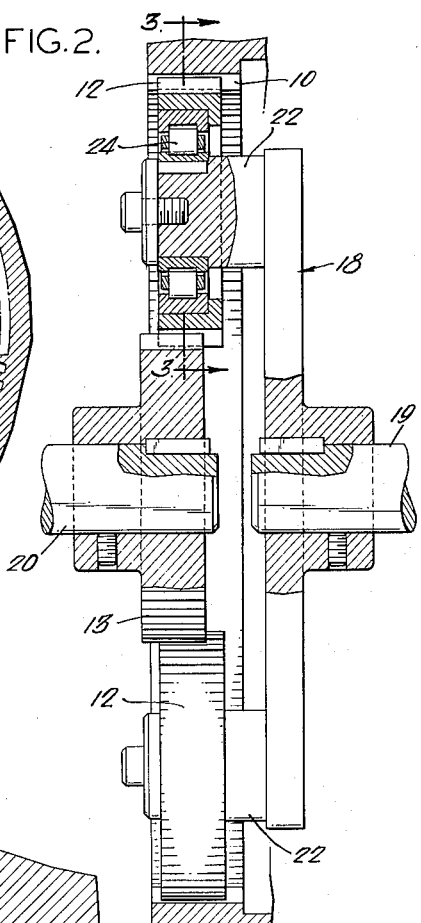
FIG. 2 is an enlarged sectional view taken on line 2—2 of FIG. 1.
Figure 3:
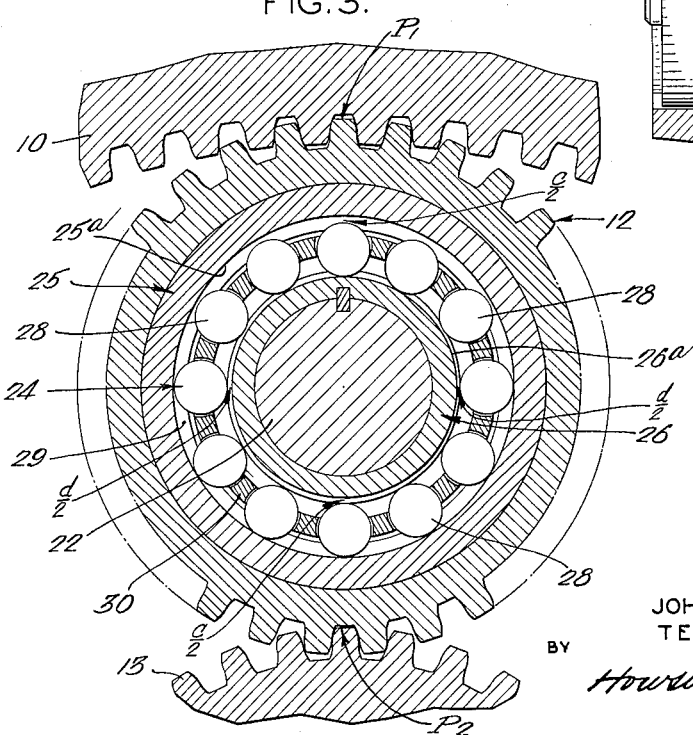
FIG. 3 is an enlarged fragmentary sectional view taken on line 3—3 of FIG. 2.

Referring now to the drawings, and particularly to FIGS. 1–3 thereof, there is illustrated a planetary gear reduction system incorporating a bearing assembly constructed in accordance with the present invention. Even though the bearing assembly is illustrated in connection with such a reduction system, it is of course to be understood that it has many other useful applications.

The general arrangement of the planetary gear reduction system is conventional and comprises a ring gear 10, a plurality of planet gears 12 which interengage and mesh with the ring gear 10 and a sun gear 13 disposed centrally of the array of planet gears 12 which meshes with each of the planet gears as shown. The planetary gear reduction system further includes a planet carrier 18 which is keyed for example to output shaft 19 and which mounts a plurality of stub shafts 22 each of which in turn mounts the inner ring of a bearing assembly 24 supporting the planet gears 12 on the planet carrier. The sun gear 13 is in turn keyed to an input shaft 20 so that rotation of the shaft 20 effects rotation of the sun gear, planet gears 12, planet carrier 18 and output shaft 19.

Figure 5:
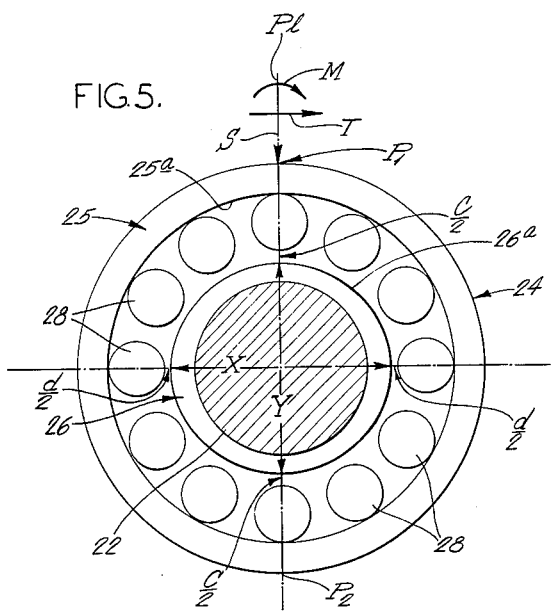
FIG. 5 is a schematic illustration of a bearing assembly in accordance with the present invention.

Each of the bearing assemblies on which the planet gears are mounted comprises an outer ring which may be press fitted in the planet gear 12 and an inner ring 26 supported on the stub shaft 22 and a plurality of rolling elements 28 guided in the annular space 29 between the raceways 25a and 26a of the outer and inner rings respectively by means of a conventional retainer or cage 30. The outer ring 25 may be formed as an integral part of the planet gear. By this arrangement, as the planet gears are revolved about the sun gear 13, the inner ring 26 remains in a fixed or stationary position relative to the diametrically opposed points $P_1$ and $P_2$ of engagement between the planet gear 12 and the sun and ring gears respectively. Meshing engagement of each of the planet gears with the ring gear and sun gear at diametrically opposed points $P_1$ and $P_2$ results in a load on the outer ring 25 of the bearing assembly which load consists of a gear tooth separating load S, a gear tooth tangential load T and a gear tooth moment load M at the diametrically opposed points $P_1$ and $P_2$ on the outer ring as illustrated schematically in FIG. 5.

In accordance with the present invention, the bearing assembly is characterized by novel features of construction and arrangement providing an increased resistance to fatigue in applications where the external load on the bearing acts at diametrically opposed points. The fatigue life is increased by providing the greatest diametral clearance between the rolling elements and the inner and outer raceways of the rings at the diametrically opposed points of application of the forces acting on the bearing assembly. More specifically, fatigue life is increased by making the raceway of the inner ring out of round or elliptical with the minor axis thereof aligned in a plane $P_L$ passing through the diametrically opposed points $P_1$ and $P_2$ of application of the force components on the bearing assembly. It has been found that the optimum arrangement for increasing resistance to fatigue is one wherein the difference between the major and minor axes of the elliptical or out-of-round raceway of the inner ring is approximately equal to twice the total diametral clearance $d$ between the rolling elements and the inner and outer raceways at the major axis of the inner ring; that is, where the total diametral clearance C between the rolling elements and the inner and outer raceways at the minor axis of the inner ring is approximately three times the total diametral clearance $d$ at the major axis.

With reference now to the planetary gear reduction system illustrated, each of the planet gears 12 meshes at diametrically opposed points with the ring gear and the sun gear as shown for example in FIGS. 1 and 3. This meshing relationship during operation of the gear system results in a gear tooth tangential force T, a gear separating force S, and a gear tooth moment load M at the diametrically opposed points, which forces or loads are transmitted to the outer ring of the bearing assembly at points $P_1$ and $P_2$ as shown schematically in FIG. 5. Under these conditions, the resistance to fatigue of the bearing assembly may be increased appreciably by making the raceway of the inner ring out of round with the minor axis Y in a plane $P_L$ passing through the diametrically opposed points of load application on the bearing assembly, and more specifically by forming the out-of-round inner raceway of the inner ring so that the difference between the major axis X and minor axis Y is approximately equal to twice the total diametral clearance $d$ at the major axis of the inner ring. By this arrangement, there is provided a maximum total diametral clearance C at the diametrically opposed points $P_1$ and $P_2$ of load application on the bearing. In the planetary gear system, as the planet gears revolve about the sun gear 13, the inner ring 26 remains stationary relative to the diametrically opposed points $P_1$ and $P_2$ where the planet gear 12 meshes with the ring gear and sun gear so that during operation of the system, the maximum diametral clearance C is at the diametrically opposed points where loads are applied to the bearing outer ring.

Tests were conducted on a rolling bearing assembly having the following characteristics and under the following test conditions and these tests and the results obtained therefrom illustrate the advantages of the present invention.

*Roller bearing tested*

Number of rollers per row _____ 14.
Number of rows _____ 2.
Roller diameter _____ 0.75 inch.
Roller effective length _____ 0.658 inch.
Roller contact angle _____ 13°, 5 min.
Outer ring section moment of inertia ___ 0.02085 inch$^4$.
Radius to neutral axis of outer ring _____ 2.6 inches.
Gear tooth tangential force (T) _____ 5800 lbs.
Gear separating force (S) _____ 2700 lbs.
Gear tooth moment load (M) _____ 2320 inch-lbs.
Outer ring rotational speed _____ 834 r.p.m.

Figure 4:
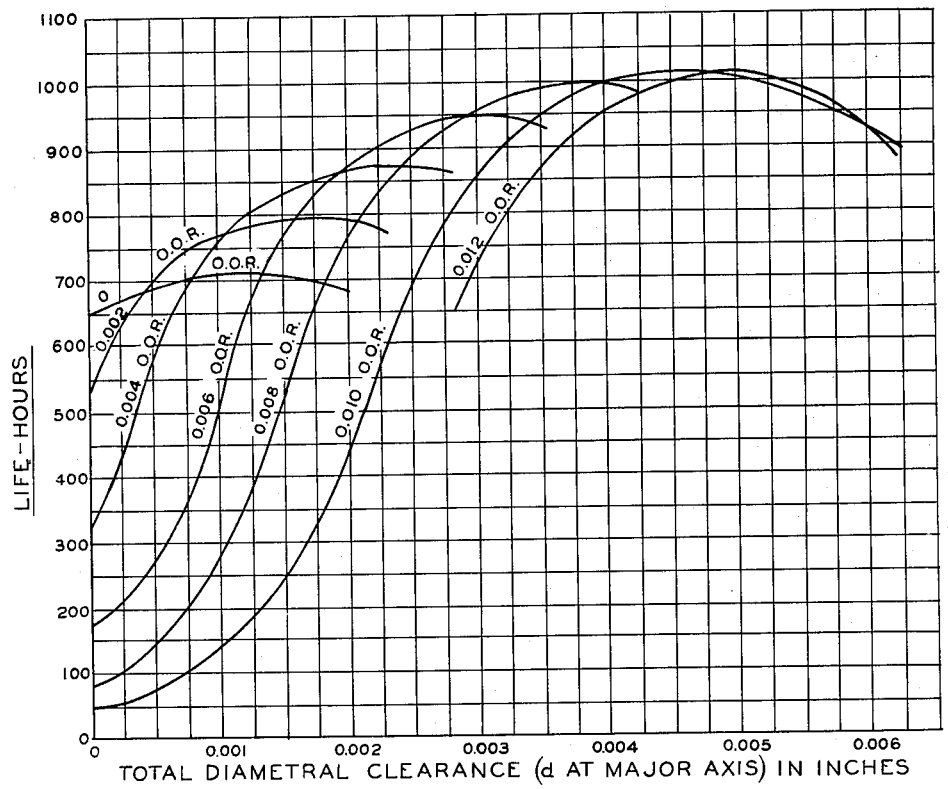
FIG. 4 is a chart showing bearing life in relation to diametral clearance and out-of-round.

$L_{10}$ life calculations were performed for various bearings under the test conditions indicated for a bearing assembly having concentric inner and outer raceways where the diametral clearance was varied and for bearing assemblies in accordance with the present invention having an inner ring with an out-of-round raceway where diametral clearances $d$ and C and out-of-round were varied discretely in predetermined increments. Out-of-round is the difference between the major axis X and the minor axis Y of the inner ring and is expressed on the graph as "O.O.R." FIG. 4 which shows the results of the parametric test study, indicates that peak $L_{10}$ life of approximately 1000 hours can be attained for a bearing of the above type under the given test conditions where the total diametral clearance $d$ at the major axis X of the inner ring is approximately 0.005 inch and the difference between the major and minor axis of the inner ring or out-of-round, "O.O.R." is approximately equal to twice the total diametral clearance $d$ or 0.010 inch. The graph of FIG. 4 illustrates that this is an increase of 300 hours or better than 40% over the same bearing having concentric inner and outer rings or zero out-of-round. The graph also illustrates that when the difference between the major axis X and minor axis Y of the inner ring is approximately equal to twice the total diametral clearance $d$ at the major axis, that optimum conditions exist for increasing the resistance to fatigue life of a given bearing assembly and that in each instance the life is much greater in such bearings than where there is zero out-of-round.

Even though the tests were conducted on a double row cylindrical roller bearing, the principle applies as well to other bearing assemblies, for example, the single row bearing assembly shown in connection with the reduction gear system.

While a particular embodiment of the present invention has been illustrated and described herein, it is not intended to limit the invention, and changes and modifications may be made therein within the scope of the following claims.

We claim:
1. A bearing assembly comprising inner and outer rings having confronting inner and outer raceways respectively and a plurality of rolling elements in the annular space between the raceways, said assembly adapted for use in applications where the assembly is loaded at least at two circumferentially spaced points and one of the rings remains stationary relative to points of application of the load, the raceway of said one ring being out of round and disposed relative to said points of load application to provide a maximum clearance between the rolling elements and the raceways at the points of load application.

2. A bearing assembly comprising inner and outer rings having confronting inner and outer raceways respectively and a plurality of rolling elements in the annular space between the raceways, said assembly adapted for use in applications where a load including at least a radially inwardly directed force component acts on the outer ring at diametrically opposed points and the inner ring is stationary relative to the points of application of the load, the raceway of said inner ring being out of round and disposed relative to said points of application to provide a maximum clearance between the rolling elements and the raceways at the points of load application.

3. A bearing assembly as claimed in claim 2 wherein said inner raceway is elliptical having transversely disposed major and minor axes and wherein the minor axis is disposed in a plane passing through the diametrically opposed points of load application.

4. A bearing assembly as claimed in claim 3 wherein the difference between the major and minor axis of the elliptical inner raceway is approximately equal to twice the total diametral clearance between the rolling elements and the raceways at the major axis of the inner raceway.

5. A bearing assembly comprising inner and outer rings having confronting inner and outer raceways respectively and a plurality of rolling elements in the annular space between the raceways, means loading one of the rings at diametrically opposed points including a radially directed force component at each of said diametrically opposed points, the raceway of said other ring being out of round and disposed relative to said points of load application to provide a maximum clearance between the rolling elements and the raceways at the points of load application.

6. A bearing assembly comprising inner and outer rings having confronting inner and outer raceways respectively and a plurality of rolling elements in the annular space between the raceways, means loading the outer ring at diametrically opposed points including a radially inwardly directed force component at each of said diametrically opposed points, the raceway of said inner ring being out of round and disposed relative to said points of load application to provide a maximum clearance between the rolling elements and the raceways of the points of load application.

7. A bearing assembly as claimed in claim 6 wherein said inner raceway is elliptical having transversely disposed major and minor axes and wherein the minor axis is disposed in a plane passing through the diametrically opposed points of load application.

8. A bearing assembly as claimed in claim 7 wherein the difference between the major and minor axis of the elliptical inner raceway is approximately equal to twice the total diametral clearance between the rolling elements and the raceways at the major axis of the inner raceway.

9. A planet gear reduction system comprising a ring gear, a sun gear, a plurality of planet gears, each of said planet gears meshing with said sun and ring gears at least at two circumferentially spaced points, a planet carrier and a bearing assembly supporting each of said planet gears on said carrier including an inner ring fixed to the planet carrier, an outer ring mounted in the planet gear and a plurality of rolling elements in the annular space between the raceways of the rings, the raceway of said inner ring being out of round and disposed relative to said circumferentially spaced points of engagement between said planet gear and said ring and sun gears respectively to provide a maximum clearance between the rolling elements and the raceways at said circumferentially spaced points of engagement between the planet gear and the ring and sun gears.

10. A system as claimed in claim 9 wherein each of said planet gears meshes with said sun and ring gears at diametrically opposed points and wherein the raceway of said inner ring is elliptical having transversely disposed major and minor axes and wherein the minor axis is disposed in a plane passing through said diametrically opposed points of engagement.

11. A system as claimed in claim 10 wherein the difference between the major and minor axis of the elliptical inner raceway is approximately equal to twice the total diametral clearance between the rolling elements and the raceways at the major axis of the inner raceway.

No references cited.

DAVID J. WILLIAMOWSKY, *Primary Examiner.*

T. C. PERRY, *Assistant Examiner.*